United States Patent [19]

Marx et al.

[11] 4,243,755

[45] Jan. 6, 1981

[54] PROCESS FOR THE MANUFACTURE OF REINFORCED POLYURETHANE FOAMS

[75] Inventors: Matthias Marx, Bad Durkheim; Dietmar Nissen, Heidelberg; Wolfgang Jarre, Ludwigshafen, all of Fed. Rep. of Germany

[73] Assignee: BASF Aktiengesellschaft, Ludwigshafen, Fed. Rep. of Germany

[21] Appl. No.: 93,375

[22] Filed: Nov. 13, 1979

[30] Foreign Application Priority Data

Nov. 22, 1978 [DE] Fed. Rep. of Germany ....... 2850610

[51] Int. Cl.³ ............................................. C08G 18/14
[52] U.S. Cl. ..................................... 521/99; 252/182; 521/101; 521/120; 521/122; 521/123; 521/136; 521/137
[58] Field of Search ................ 521/99, 101, 120, 122, 521/123, 136, 137; 252/182

[56] References Cited

U.S. PATENT DOCUMENTS

| 3,523,093 | 8/1970 | Stambergen | 521/137 |
| 3,869,413 | 3/1975 | Blankenship | 521/115 |
| 4,073,840 | 2/1978 | Saidla | 521/99 |
| 4,108,791 | 8/1978 | Wasilczyk | 521/99 |

Primary Examiner—Maurice J. Welsh
Attorney, Agent, or Firm—David L. Hedden; Norbert M. Lisicki

[57] ABSTRACT

The invention relates to a process for the manufacture of reinforced polyurethane foams based on the reaction of organic polyisocyanates and polyols in the presence of filler dispersions. These dispersions are prepared by in situ crushing of the filler in the polyisocyanate or polyol to a particle size of less than 7 microns.

9 Claims, No Drawings

PROCESS FOR THE MANUFACTURE OF REINFORCED POLYURETHANE FOAMS

BACKGROUND OF THE INVENTION

1. Field of the Invention

The invention relates to a process for the manufacture of reinforced polyurethane foams based on the reaction of organic polyisocyanates and polyols in the presence of filler dispersions. More specifically, this invention relates to a process of manufacturing reinforced polyurethane foams by the in situ crushing of organic and/or inorganic fillers in polyisocyanates or polyols to particle sizes of less than 7 microns.

2. Prior Art

It is a known fact to produce polyurethane foams with varied physical properties by reacting compounds with a plurality of active hydrogen atoms, particularly polyhydroxy compounds containing polymers as reinforcing agents, with polyisocyanates, chain extension agents, cross-linking agents, foaming agents, activators, emulsifiers, and other additives. If the components are suitably chosen, flexible as well as rigid foams, lacquers, coatings or elastomers can be produced in this manner.

For many areas of application, the viscosity of the polymer-polyol mixture used is an important consideration in the manufacture of polyurethane plastics. This is particularly true for the manufacture of polyurethane foams where the polymer-polyol mixture must be capable of being pumped through metering devices as well as being mixed in mixing chambers homogeneously as quickly as possible with the isocyanate component as well as with the additives such as activators, emulsifiers, water and/or foaming agents. For this reason, viscosities as low as possible are desirable in the manufacture of polyurethane foams. Poor mixing of the reactants during the polyurethane manufacture due to high viscosities result in inhomogeneties and the polyurethane composition produced is of inferior quality insofar as the physical properties are concerned.

It is furthermore known that the addition of polymerizates containing groups which react with isocyanates can increase the load-bearing capacity of low density flexible polyurethane foams (U.S. Pat. No. 3,523,093). An initial drawback of the referenced process is that the polymers suitable as fillers must be polymerized in the presence of organic solvents namely alcohols and mercaptans containing monofunctional active hydrogen atoms. If one proceeds according to the data of this publication and uses the brittle polymerizate powders described therein as fillers, the viscosity of the mixture containing higher concentrations of the polymerizate in the polyhydroxy compound increases to such a degree that the mixture is difficult to handle since it no longer is free flowing. Also, since the polymerizate powders precipitate relatively quickly, the dispersions are not storage-stable.

This U.S. patent further indicates that the polymerizates described therein cannot be used when a certain molecular weight has been exceeded since the viscosity of the polymer-polyol mixture will then become so great that it can no longer be used for the manufacture of polyurethanes. Highly viscous polymer-polyol mixtures cannot be used without special measures for processing, for instance, on high pressure foaming machinery.

According to U.S. Pat. No. 3,869,413, flexible polyurethane foams are produced from polyisocyanates and a polyether polyol which contains a polymer in latex form having a particle size of 1000 to 10,000 angstrom in a concentration of 2 to 50 percent by weight based on the polymer polyol mixture, the said polymer being obtained by the polymerization of one or more ethylenically unsaturated monomers which are free of groups which could react with isocyanate or hydroxyl groups under urethane formation conditions. A disadvantage of this process is that the mechanical properties, in particular the tensile strength of the flexible foams produced in this manner, is unsatisfactory. Furthermore, the solid contents of the aqueous polymer dispersion, particularly in the case of styrene-acrylonitrile copolymerizates containing large amounts of acrylonitrile, are extremely low so that high processing costs are connected with the removal of water.

Also known are dispersions of copolymers, preferably styrene-acrylonitrile copolymers, in hydroxyl group containing polyethers (German Pat. Nos. 12 22 669, 11 52 536, and 11 52 537). If the vinyl monomers are copolymerized directly in the polyols, the resulting particles are generally so small that there is no tendency towards sedimentation. The disadvantage of these dispersions is, however, that they must be free of monomers in order to result in foams which are as odorless as possible and which are toxicologically unobjectionable. This means that the monomers must be separated from the dispersion, for instance, with the aid of thin film evaporators.

The state-of-the-art also includes processes where inert fillers of organic or inorganic nature are incorporated into one of the starting components for the foaming or which are directly incorporated into the foaming mixtures, for instance, in the mixing chamber of a foaming machine. However, these processes also have serious drawbacks. Using traditional fillers, it is thus extremely difficult to produce dispersions having such a fine particle distribution that storage stable mixtures are obtained. The danger of sediment formation is always very pronounced requiring those dispersions to be stirred more or less intensively in order to avoid difficult redispersing processes. Among these are polyurethane foams filled with barium sulfate.

SUMMARY OF THE INVENTION

It is the purpose of this invention to produce reinforced polyurethane foams from foamable polyisocyanate polyol systems containing fillers which, with the technically desired filler concentrations, can be processed on high pressure machines in quickly reacting batches.

A process for the manufacture of reinforced polyurethane foams has been developed based on organic polyisocyanates, polyols, fillers, foaming agents, catalysts and possibly chain extenders and auxiliaries wherein fine particle dispersions are used as fillers which are produced by in situ crushing with high local energy density to particle sizes of less than 7 microns and simultaneous dispersion of organic and/or inorganic fillers in polyols or organic polyisocyanates.

Preferably, flexible and semi-rigid polyurethane foams are produced in accordance with the process according to this invention. However, rigid polyurethane foams, as well as integral-skin foams, and polyisocyanurate foams can also be prepared by using the fine particled filler dispersions.

The process according to this invention has numerous advantages. Due to the in situ crushing of the filler materials to particle sizes smaller than 7 microns and simultaneous dispersion in the polyol, stable dispersions are obtained which do not develop sediment whatsoever after having been stored for 6 months. The filler-polyol-dispersions can be processed by conventional low and high pressure machinery. Plugging of the pipe line systems and a blocking of the control devices does not occur.

In the case of flexible polyurethane foams, the process according to this invention results in open celled foam, and increases the load-bearing capacity and elasticity without impairing the elongation and tear-strength. In addition to a remarkable increase in the compression strength, in some cases a surprising increase in the tear-strength was also observed.

Use of the filler polyol dispersion made possible a definite control of the open-celled property of semi-rigid polyurethane foams and integral-skin foams. As an additional desired effect, an increase in the elasticity modulus and an improvement in the thermal expansion coefficient was noted in the case of microcellular materials of higher densities. Due to the considerable differences in the expansion coefficients, it is difficult to use metal and plastic parts together as construction materials even if this would be desirable for reasons of saving weight and a reduction in the manufacturing costs. As a result of the process according to this invention, the use of metal and plastic materials together is made possible in many cases. To date, the manufacture of cold and hot molded foams, as well as the foam backing of foils with semi-rigid foams, presented a problem in processing these quickly reacting polyurethane systems in complicated molds to form void-free parts. Due to the cell opening effect and the special rheology of the systems aided by the very fine particled filler polyol dispersions, this drawback is largely eliminated by reducing the void spots particularly in complicated forms. The reject and touch-up rate is considerably reduced. In this regard also, the dispersions processable according to the invention favorably differ from known organic dispersions based on graft and precipitation polymers.

DESCRIPTION OF THE PREFERRED EMBODIMENT

An important property of this invention is the use of fillers for the manufacture of the foamed, reinforced plastics, namely in the form of fine particled dispersions, which are produced by in situ crushing with high local energy density to particle sizes of less than 7 microns and simultaneous dispersion of organic and/or inorganic fillers in the above-referenced polyols or organic polyisocyanates as dispersing medium.

The filler materials are initially crushed to particle sizes smaller than 100 microns. For this purpose, coarsely grained materials can be ground by mechanical mills such as impact pulverizers, pinned disc mills, and other types. However, it is also possible to obtain particle sizes smaller than 100 microns by using methods such as dissolution and reprecipitation.

In the presence of polyisocyanates or polyols and possibly dispersing auxiliaries, the fillers pretreated in the above-referenced manner are now crushed in situ to particle sizes smaller than 7 microns (wet crushing).

The wet crushing may, for example, be carried out in mechanical dispering devices, preferably in dispersing machines having high local energy density with grinding materials such as ball mills, pebble mills, Netsch mills, Dyno mills, planetary ball mills, tube mills and attrition mills. Preferably used grinding materials are spherical grinding materials consisting, for example, of glass, ceramic, metal, rigid, and abrasion-resistant plastics such as polyamides. The diameters of these may vary between 0.2 to 8, preferably 0.4 to 5, millimeters.

In wet crushing, the filler material is mixed with the polyol as a dispersing medium in such quantities that the resulting dispersion has a filler content of 3 to 50 percent by weight, preferably 5 to 20 percent by weight, based on the total weight. The total amount of filler material can be mixed with the total amount of dispersing medium and possibly dispersing auxiliaries can be crushed and can be dispersed at the same time. However, it is also possible to mix the entire amount of dispersing medium with a certain part such as 10 to 80 percent, preferably 40 to 60 percent, of filler material and to crush this mixture to a particle size of 2 to 10 microns and to then incorporate the remaining amount of filler in the mixture or to grind a partial quantity of dispersing medium with the total amount of filler in the presence of a dispersing auxiliary and to add additional dispersing medium and possibly dispersing auxiliaries during the grinding process.

In some cases, it may be advantageous to crush the filler substances proportionally in polyisocyanate and polyol as the dispersing medium. This may, for example, be the case when a large amount of filler is employed or when an unfavorable structure of the dispersed particles is employed which unfavorably influences rheological behavior of the dispersion.

As organic fillers, organic materials may be used which either do not swell in the dispersing medium or, at the very most, swell slightly and which are sufficiently brittle in order to be crushed under industrial conditions by means of wet grinding to the required particle size in economically feasible times. In particular, these include: brittle resins which are familar as binders for the printing industry, for instance those based on phenol and formaldehyde, or colophonium or melamine and formaldehyde, polyester, preferably cross-linked polyesters based on di- or higher functional carboxylic acids with di- or high functional alcohols, copolymerizates of styrene with monomers such as methacrylic acid derivates, homo- and copolymerizates of cyclopentadienes, ketone resins, for instance based on cyclohexanone, and brittle polyurethane materials such as cross-linked polyurethanes and polyurethanes containing isocyanurate groups.

Particularly well proven and, therefore, preferably used however, are inorganic fillers such as the basically known, commonly applied fillers, reinforcing agents, weighting agents, agents for improving the abrasion behavior in paints, coating agents, and so forth. However, inorganic pigments may also be used. More particularly, these are: silicate minerals, for instance stratified silicates such as antigorite, serpentine, hornblende, amphiboles, chrisotile, talcum, metal oxides such as kaolin, aluminum oxide, titanium oxide, iron oxide; metal salts such as chalk, heavy spar, barium sulfate; inorganic pigments such as cadmium sulfide, zinc sulfide, as well as glass and asbestos meal.

It may be of advantage to use dispersing auxiliaries in quantities of 0.005 to 10 percent, preferably of 0.01 to 2 percent, relative to the weight of filler in manufacture of the filler dispersions. Among these are, for example, dispersing auxiliaries such as silicones, esters of higher fatty acids, for instance, mono-, di- and triglycerides of oleic acid, or of linoleic fatty acids. As was already shown, it is of basic importance for the manufacture of the foamed reinforced plastics that the organic and/or preferably inorganic filler materials are crushed in situ in the organic polyisocyanates or preferably polyols with the aid of high local energy densities to particle sizes of smaller than 7 microns, preferably 0.01 to 7 microns, and in particular, 0.05 to 2.5 microns, and that they are dispersed simultaneously. By local energy densities are understood to be energy densities of 50 to 3000 kilowats per cubic meter, preferably 500 to 2000 kilowats per cubic meter.

The obtained filler polyisocyanates and filler polyol dispersions which, with a solid content of 15 percent by weight, have viscosities of less than 2500 centipoise, preferably 1000 to 2000 centipoise, at 25° C. and which can be processed very well by commonly used processing machines for the manufacture of polyurethanes can, if desired, be adjusted to the required solids contents with additional polyisocyanate or polyol prior to the final processing.

The reinforced polyurethane foams are produced in accordance with the process of this invention from the above-referenced organic polyisocyanates, polyols and filler dispersions in the presence of catalysts, foaming agents and, if required, chain extension agents and additional materials.

Included as possible polyisocyanates are aliphatic and aromatic polyisocyanates, for instance, alkylene diisocyanates such as tetra and hexamethylene diisocyanates, arylene diisocyanates, and their alkylation products such as phenylene diisocyanate, naphthalene diisocyanate, diphenylmethane diisocyanate, toluene diisocyanate, di- and triisopropylbenzene diisocyanate, and triphenylmethane triisocyanate, p-isocyanatophenyl-thiophosphorictriester, p-isocyanatophenyl-phosphorictriester; aralkyldiisocyanates such as 1-(isocyanatophenyl)ethyl isocyanate or xylenediisocyanates as well as polyisocyanates substituted with the most diverse substitutes such as alkoxy-, nitro- and/or chlorine radicals; also, those polyisocyanates which are modified with less than equimolar amounts of polyhydroxyl compounds such as trimethylolpropane, hexanetriol, glycerine, propylene glycol or 1,4-butanediol, as well as hydroxy terminated difunctional polyesters. Polyisocyanates capped with phenols or bisulfite, acetyl-modified isocyanates and amide, acylurea, carbodiimide, and isocyanurate-modified polyisocyanates may also be used.

Preferably used are toluene diisocyanates, diphenylmethane diisocyanates, mixtures of diphenylmethane diisocyanates and polyphenyl polymethylene polyisocyanates (crude MDI), mixtures of toluene diisocyanates and crude MDI with polyisocyanates modified with polyhydroxyl compounds and polyisocyanates containing isocyanurate rings.

Common linear and/or branched polyester polyols and, in particular, polyether polyols having molecular weights of 200 to 8000, preferably 800 to 6000, and in particular 1800 to 4500, are used as polyols for the process according to this invention. Other hydroxyl group-containing polymers having the above mentioned molecular weights such as polyester amides, polyoxymethylenes and polycarbonates, in particular those produced from diphenyl carbonates and 1,6-hexanediol by transesterification, may also be employed.

The polyester polyols may be produced, for example, from dicarboxylic acid, preferably aliphatic dicarboxylic acid, having 2 to 12, preferably 4 to 8, carbon atoms in the alkylene radical, and multifunctional alcohols, preferably diols and triols. Examples include aliphatic dicarboxylic acids such as glutaric acid, pimelic acid, suberic acid, azelaic acid, sebacic acid, undecanedioic acid, dodecanedioic acid, and preferably succinic, glutaric, and adipic acid; and aromatic dicarboxylic acids such as phthalic acid and terephthalic acid. Examples of bi- and multifunctional, in particular bi- and trifunctional alcohols, are: ethylene glycol, diethylene glycol, propylene glycol, trimethylene glycol, dipropylene glycol, 1,10-decane diol, glycerine, trimethylolpropane, and preferably 1,4-butanediol and 1,6-hexanediol.

The polyester polyols have molecular weights of 800 to 5000, preferably 1000 to 3000, and hydroxyl numbers of 25 to 170, preferably of 40 to 110.

Preferably used are polyether polyols which are manufactured according to processes well known to those skilled in the art from one or several alkylene oxides with 2 to 4 carbon atoms in the alkylene radical and a starter molecule which contains 2 to 8, preferably 2 to 4, active hydrogen atoms. Suitable alkylene oxides include propylene oxide, 1,2- or 2,3-butylene oxide, styrene oxide, preferably ethylene oxide and propylene oxide. The alkylene oxides may be used individually, alternatingly in sequence, or as mixtures. Similar compounds may also be prepared employing tetrahydrofuran and oxetane. Possible starter molecules are: water, dicarboxylic acids such as succinic acid, adipic acid, phthalic acid and terephthalic acid; primary amines and possibly N-mono-, N,N- and N,N'-dialkyl-substituted amines having 1 to 4 carbon atoms in the alkyl radical; and possibly mono- and dialkyl-substituted alkylene diamine, propylenediamine, 1,3-propanediamine, 1,4-butylenediamine, 1,6-hexamethylenediamine, 4,4'-, 2,4'- and 2,2'-diaminodiphenyl methanes as well as 2,4- and 2,6-toluene diamines, alkanol amines such as ethanolamine, diethanolamine, N-methyl and N-ethyl diethanolamine and triethanolamine, hydrazine and preferably multifunctional alcohols such as ethylene glycols, propylene glycol, diethylene glycols, dipropylene glycols, 1,4-butanediol, 1,6-hexanediol, glycerine, trimethylolpropane, pentaerythritol, sorbitol and sucrose.

Preferably used are primarily linear and trifunctional polyether polyols having molecular weights of 200 to 8000, preferably of 800 to 6000, and particularly 1800 to 4500, and hydroxyl numbers of 15 to 800, preferably of 25 to 200, which contain ethylene oxide as well as propylene oxide units in the oxyalkylene chain and wherein these can be arranged either randomly or block wise in the oxyalkylene chain. Particularly useful are polyether polyols which contain primary hydroxyl groups.

The polyols used may have hydroxyl numbers varying over a wide range. Generally the hydroxyl numbers of the polyols used according to this invention are within the range of approximately 15 to approximately 800 and above, preferably 25 to 200, and in particular approximately 25 to approximately 45. The hydroxyl number is defined as the number of milligrams of potassium hydroxide equivalent to the hydroxyl content in one gram of polyol. The hydroxyl number can also be defined by the following equation:

$$OH = (56.1 \times 1000 \times f)/MW$$

in this equation:
OH stands for the hydroxyl number of the polyol,
f represents the functionality, that is the average number of hydroxyl groups per molecule of polyol,
MW is the molecular weight of the polyol.

The polyol which is used depends upon the final application of the polyurethane product to be produced therefrom. The molecular weight or the hydroxyl number is chosen so that flexible, semi-rigid and rigid foams are obtained. The polyols, preferably, have a hydroxyl number of approximately 200 to approximately 1000 when they are used for rigid foams; they have approximately 25 to approximately 150 for the manufacture of semi-rigid foams; and have approximately 20 to approximately 70 or more for use in the manufacture of flexible foams. However, these limits in no way restrict the present invention but they only serve as an explanation for the large number of possible combinations of the referenced polyols.

Suitable catalysts for accelerating the polyurethane formation from polyols, water, possibly chain extension agents, and polyisocyanates include tertiary amines such as dimethylbenzyl amine, N,N,N',N'-tetramethyl-diamino-ethyl ether, bis-(dimethylaminopropyl)-urea, N-methyl and/or N-ethyl morpholine, dimethyl piperazine, 1,2-dimethylamidazole, 1-azo-bicyclo-(3,3,0)-octane and preferably triethylenediamine, metal salts such as tin dioctoate, lead octoate, tin diethylhexoate, and preferably tin-(II) salts, and dibutyltin dilaurate, as well as particularly mixtures consisting of tertiary amines and organic tin salts. Preferably used are 0.1 to 5.0 percent by weight tertiaryamine catalysts and/or 0.01 to 1.0 percent by weight of metal salt catalysts based on the weight of the polyols.

The traditional cyclization and polymerization catalysts for polyisocyanates have proven to work well in the manufacture of polyisocyanurate foams. Examples include: strong bases such as quaternary ammonium hydroxides, for instance, benzyltrimethylammonium hydroxide; alkali metal hydroxides such as sodium or potassium hydroxide; alkali metal alkoxides such as sodium methylate and potassium isopropalate; trialkylphosphine such as triethyl phosphine; alkylamino alkylphenols such as 2,4,6-tris-(dimethylaminomethyl)-phenol; 3 and/or 4 substituted pyridines such as 3- or 4-methyl pyridine; metal organic salts such as tetrakis-(hydroxyethyl)-sodium borate; Friedel-Crafts catalysts such as aluminum chloride, iron-(III)-chloride, borofluoride and zinc chloride and alkali metal salts of weak organic acids and nitrophenolates such as potassium octoate, potassium-2-ethylhexoate, potassium benzoate, sodium picrate and potassium phthalamide. Preferably used are the strongly basic N,N',N''-tris-(dialkylaminoalkyl)-s-hexahydrotriazines such as the N,N',N''-tris-(dimethyl-amino-propyl)-s-hexahydratriazine.

The proper amount of catalyst for the manufacture of the polyurethane foams according to this invention is a function of the effectiveness of the catalyst under consideration. Generally, it has proven to be appropriate to use 1 to 15 parts by weight, preferably 3.5 to 10 parts by weight, of catalyst for 100 parts by weight of organic polyisocyanate.

Blowing agents which can be used according to the process of this invention include water, which reacts with isocyanates by forming carbon dioxide. The water quantities which can be used appropriately are 0.1 to 3 percent based on the weight of polyisocyanate. If required, larger quantities of water may also be used.

Other applicable blowing agents are low-boiling liquids which vaporize under the influence of the exothermal polymerization reaction. Suitable for this are liquids which have boiling points below 100° C. and which are inert towards the organic polyisocyanate. Examples of such preferably used liquids are halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low-boiling liquids and/or mixtures of these liquids with other substituted or unsubstituted hydrocarbons can also be used.

The most appropriate quantity of low-boiling liquid for the manufacture of foamed polyurethane materials is a function of the desired foam density as well as possibly of the use of water. Generally, quantities of 5 to 40 percent by weight relative to 100 parts by weight of organic polyisocyanate provide satisfactory results.

Under certain circumstances it is also desirable to use additional chain extenders for the manufacture of the foamed reinforced plastics in addition to the higher molecular weight polyols. The chain extenders have molecular weights of less than 2000, preferably of 30 to 600, and preferably have two active hydrogen atoms. Examples to be taken into consideration include aliphatic and/or aromatic diols with 2 to 4, preferably 2 to 6, carbon atoms such as propylene glycol, 1,5-pentanediol, 1,6-hexanediol, and preferably ethylene glycol, 1,4-butanediol and bis-(2-hydroxyethyl)-hydroquinone; diamines such as ethylenediamine and possibly 3,3'-disubstituted 4,4'-diaminodiphenyl methanes, ethanolamines such as triethanolamine and polyhydroxyl compounds such as glycerine, trimethylolpropane, and low molecular hydroxyl group containing polyalkylene oxides of the above-referenced raw materials.

Additives may also be incorporated in the reaction mixture. Examples include surface active foam stabilizers, hydrolysis protection agents, pore regulators, substances with fungistatic and bacteriostatic properties, dyes, pigments and flame retarding agents.

Possible surface active substances include those which support the homogenization of the raw materials and which are possibly also suited for regulating the cell structure of the foams. To be mentioned as examples are siloxane-oxyalkylene mixed polymerizates and other organo-polysiloxanes, oxyethylated alkyl phenols, oxyethylated fatty alcohols, paraffin oils, castor oil and/or resinoleic ester and Turkey red oil which are used in quantities of 0.2 to 6 parts by weight per 100 parts by weight of polyisocyanate.

Suitable flame retardants include tricresyl phosphate, tris-2-chloroethyl phosphate, tris-chloropropyl phosphate, and tris-2,3-dibromopropyl phosphate.

In addition to the already mentioned halogen-substituted phosphates, inorganic flame retardants such as antimony trioxide, arsenic oxide, ammonium phosphate and calcium sulfate can also be used to make the polyurethane foams flame resistant. In general, it has proven advantageous to use 5 to 50 parts by weight, preferably 5 to 25 parts by weight, of the referenced flame retardants per 100 parts by weight of the organic polyisocyanate.

More detailed data on the above-referenced other commonly used additives are contained in the literature, for instance, the monograph by J. H. Saunders and K. C. Frisch "High Polymers" Vl. XVI, Polyurethanes, Part 1 and 2, Interscience Publishers, 1962 or 1964.

As was already shown, the filler polyol dispersions can be diluted with the above-referenced polyols and can thus be adjusted to the advantageous filler content required for the manufacture of the reinforced polyurethane foames according to the process of this invention.

For the manufacture of polyurethane foams, the polyisocyanates and polyols and/or mixtures of polyols and chain extenders are reacted in such quantities that the ratio of OH:NCO groups is 1:0.8 to 2.5, preferably 1:0.9 to 1.2, and in particular 1:1, and that the filler content in the foamable mixture is 0.5 to 15 percent by weight, preferably 1 to 10 percent by weight, based on the weight of the polyisocyanatepolyol mixture. If water is used as foaming agent, the ratio of NCO groups of the polyisocyanate to Zerewitinoff-active hydrogen atoms bonded to polyol, possibly chain extenders and water, is appropriately 0.8 to 2.5, preferably 0.9 to 1.2.

For the manufacture of polyisocyanurate foams, quantity ratios of NCO groups of the polyisocyanate to hydroxyl groups of the polyols from 6 to 60:1, preferably from 2 to 10:1, have proven to work well. The filler content amounts to 0.5 to 15 percent by weight, preferably 1 to 10 percent by weight, based on the total weight of polyisocyanate and polyol.

The reinforced polyurethane foams may be produced by the prepolymer and one-shot process, preferably by the one-shot process. For this purpose, the polyisocyanates are mixed intensively with the filler polyol dispersions and/or polyols, catalysts, foaming agents and, possibly chain extenders, and additives in the referenced quantity ratios at temperatures of 0° to 50° C., preferably 15° to 40° C., and the reaction mixture is then allowed to foam in opened or closed molds.

When free-foamed, the polyurethane foams according to this invention have densities of 10 to 300 grams per liter, flexible foams having densities of 10 to 60 grams per liter, semi-rigid foams having densities of 60 to 130 grams per liter, and the polyurethane integral-skin foams having densities of 60 to 300 grams per liter. The polyurethane foams excel particularly in their high degree of open cells and good compression strength. The products are preferably used as upholstery foams, also for safety covers, as well as shoe soles, arm supports, neck supports, seat cushions and other applications. The polyisocyanurate foams have densities of 5 to 100 grams per liter, preferably 10 to 50 grams per liter. Due to their excellent insulating properties, they are particularly well suited for double wire elements.

The following Examples are provided to further illustrate the invention. All parts are by weight unless otherwise designated.

EXAMPLE 1

To 500 parts of a product produced by the combined precipitation from barium sulfate and silicic acid (calcining loss 6 percent by weight, $SiO_2$-content 73 percent and $BaSO_4$-content 21 percent, pH value according to DIN 53,200=7.0) having an average particle size of 70 microns was added 2000 parts of a polyether polyol produced from glycerine, propylene oxide and ethylene oxide, having a molecular weight of 4900 and a hydroxyl number of 35. The mixture was crushed for four hours in a ball mill, the inside wall of which was rubber lined. Glass balls were used in the mill. The speed of rotation of the ball mill was selected in such a manner that the local energy density was approximately 1500 kilowatts per cubic meter and that a temperature of 35° C. of the dispersion was not exceeded during the dispersing period. Subsequently, the dispersion was removed from the mill and a sedimentation analysis was carried out. The result was that 95 percent of the particles contained in the dispersion were smaller than 1 micron and 50 percent of the particles were smaller than 0.5 micron. The storage-stable dispersion did not display any sedimentation after more than 6 months.

EXAMPLE 2

To 480 parts of a kaolin having a pH value of 5.5 and a specific weight of 3.6 grams per cubic centimeter, where 99.5 percent by weight of the particles were smaller than 10 microns and 80 percent by weight of the particles were smaller than 2 microns, was added 1800 parts of a polyether polyol prepared from trimethylolpropane, propylene oxide and ethylene oxide, having a molecular weight of 5000 and a hydroxyl number of 32. The suspension was subsequently passed 5 times through a continuously operating ball mill. The total duration of the grinding process was two hours. The local energy density was approximately 800 kilowatts per cubic meter. A sedimentation analysis of the resulting dispersion showed that less than 1 percent by weight of the particles were larger than 3 microns, approximately 80 percent by weight of the particles were approximately one micron, 20 percent by weight of the particles were smaller than 0.5 micron. After four months, the dispersion did not show any signs of sedimentation.

EXAMPLE 3

To 200 parts of a commercially available talc powder containing 62.6 percent by weight of $SiO_2$, 31.4 percent of MgO, 0.20 percent by weight of $Al_2O_3$, 0.10 percent by weight of $Fe_2O_3$, 4.8 percent by weight of water, a density of 2.77 grams per cubic centimeter, and a grain size of approximately 60 microns was added 800 parts of a polyether polyol prepared from trimethylolpropane, propylene oxide and ethylene oxide having a molecular weight of 4900 and a hydroxyl number of 35. The mixture was pulverized at 40° C. by passing five times through a continuously operating ball mill filled with glass balls (ball diameter 3 millimeters). The total duration of the grinding process amounted to 5 hours. The local energy density was approximately 600 kilowatts per cubic meter. A sedimentation analysis of the resulting dispersion showed that 92 percent of the particles had a diameter smaller than 3 microns.

EXAMPLE 4

Manufacture of a semi-rigid polyurethane foam for foam backing of foils.

A mixture of (a) 69.5 parts of a polyether polyol prepared from glycerine, ethylene oxide and propylene oxide having an OH number of 32.5 and a molecular weight of 5000, (b) 20 parts of the filler-polyether polyol dispersion produced according to Example 3, (c) 8.4 parts of a polyether polyol prepared from ethylene diamine-propylene oxide having a molecular weight of 300, (d) 0.3 parts dimethylethanolamine and (e) 1.8 parts of water was reacted with 50 parts of a mixture consisting of diphenylmethane-diisocyanates and polyphenyl polymethylene polyisocyanates (crude MDI) on a low pressure foaming machine resulting in an impact protection material with PVC foil coating. While the material was being processed, a foam pressure of 30 millibar was measured. The foamed part was essentially free of flaws.

COMPARATIVE EXAMPLE A

The procedure of Example 4 was followed with the exception that 89.5 parts of component (a) instead of components (a) and (b) was employed, and a foaming pressure of 350 millibars was measured. The foam structure of the molded pice was irregular and interspersed by voids.

EXAMPLE 5

Manufacture of a Flexible Foam for Upholstered Furniture

A mixture containing 800 parts of the following proportions:

- (a) 70 parts of a polyether polyol prepared from glycerine, propylene oxide and ethylene oxide having a molecular weight of 4900, a hydroxyl number of 36 and 73 percent primary hydroxyl groups,
- (b) 30 parts of the filler-polyether polyol dispersion produced according to Example 3,
- (c) 2.8 parts of water,
- (d) 0.4 part of an oxypropylated pentaerythritol with an average molecular weight of 620,
- (e) 2.0 parts of N-methyldicyclohexylamine,
- (f) 0.5 part of a polydimethyl siloxane (commercial product Tegostab B 4690 by Goldschmidt AG) and
- (g) 0.05 part dibutyltindilaurate was mixed intensively with 200 parts of a mixture consisting of diphenylmethane diisocyanates and polyphenyl polymethylene polyisocyanates (crude MDI) at 24° C. upon which 800 parts of this mixture was poured into an aluminum mold (40×40×10 centimeters) and was allowed to foam. The resulting polyurethane foam had the following mechanical properties:

| | |
|---|---|
| Tensile strength (N/mm$^2$): | 0.115 |
| Graves Tear Strength (N/mm): | 0.573 |
| Compression Strength at 20% compression (N/mm$^2$): | 0.206 |
| Compression Strength at 40% compression (N/mm$^2$): | 0.444 |

COMPARATIVE EXAMPLE B

The procedure of Example 5 was followed with the exception that 100 parts of component (a) instead of components (a) and (b) were employed. A polyurethane with the following mechanical properties was obtained:

| | |
|---|---|
| Tensile Strength (N/mm$^2$): | 0.086 |
| Graves Tear Strength (N/mm): | 0.0434 |
| Compression Strength at 20% compression (N/mm$^2$): | 0.172 |
| Compression Strength at 60% compression (N/mm$^2$): | 0.379 |

Example 5 and the Comparative Example B show that the addition of the filler-polyetherate dispersion simultaneously increased the load-bearing capacity of the polyurethane foam and improved the tensile and Graves tear strength. The other properties remained essentially the same.

EXAMPLES 6–8

Manufacture of Cold-Cured Flexible Polyurethane Foams.

A mixture consisting of 560 parts of a trifunctional polyether polyol based on glycerine, ethylene oxide and propylene oxide with a hydroxyl number of 34 and a molecular weight of 4900, 240 parts of a polyether polyol dispersion produced with various fillers in accordance with Example 3, 22.4 parts of water, 3.2 parts of a polyether polyol prepared from pentaerythritol and propylene oxide with a hydroxyl number of 360 and a molecular weight of 600, 16.6 parts of dicylcohexylmethylamine, 4.0 parts of a foam stabilizer based on polysiloxane-polyoxyalkylene-polymerization (Tegostab ® B 4690 by Goldschmidt AG in Essen) and 0.4 part of dibutyltindilaurate was intensively mixed with 282 parts of a mixture consisting of 80 percent by weight of a commercially available toluene diisocyanate mixture (consisting of 80 parts 2,4- and 20 parts 2,6-toluene diisocyanate) and 20 percent by weight of a mixture of diphenylmethane diisocyanates and polyphenyl polymethylene polyisocyanates (crude MDI)

using an agitator and was placed in molds where it was foamed into cushions having dimensions of 40×40×10 centimeters. Samples were taken from the resulting molded parts.

The type and quantity of the applied fillers and the mechanical properties of the resulting polyurethane foams have been compiled in Table I. Comparative Example C was prepared with 800 parts of the trifunctional polyether polyol containing no filler dispersion.

The polyurethane foams produced in accordance with the process of this invention have markedly improved elasticity, Graves tear strength and compression strength.

Table I

| | | | Mechanical Properties of the Polyurethane Foam | | | | | | |
|---|---|---|---|---|---|---|---|---|---|
| Example | Type of Filler | % by Weight in the Poly-Urethane Foam | Density (g/l) | Tensile Strength [k Pa] | Breaking Elongation [%] | Graves Tear Strength [N/mm] | Compressive Strength [k Pa] | | |
| | | | | | | | 20% | 40% | 60% |
| 6 | China Clay Supreme | 4.2 | 49.9 | 158 | 146 | 0.736 | 2.92 | 3.98 | 6.84 |
| 7 | Dicyclopentadienyl Resin | 2.1 | 50.2 | 159 | 142 | 0.707 | 2.81 | 3.95 | 6.98 |
| 8 | Coal Dust | 4.2 | 47.4 | 118 | 118 | 0.694 | 3.49 | 4.79 | 7.76 |
| Comparative Example C | — | | 49.5 | 105 | 153 | 0.483 | 1.87 | 2.58 | 4.32 |

EXAMPLE 9

Component A:

100 parts of a dispersion consisting of 10 parts of a commercially available sodium aluminum silicate (Transpafill ® by Degussa) and 90 parts of a polyester polyol prepared from adipic acid, 1,4-butane diol, 1,5-pentanediol, and 1,6-hexanediol having a hydroxyl number of 56 and a viscosity at 75° C. of 650 mPas which was obtained by mixing and grinding the components with a dissolver for one hour was mixed with

- 13.96 parts of ethylene glycol,
- 1.64 parts of a 33 percent solution of diazabicyclooctane and dipropylene glycol,
- 0.68 part of silicone oil (Tegostab® B 4822 by Goldschmitt AG in Essen),
- 13.68 parts of trichlorofluoromethane,
- 3.42 parts of trichlorotrifluoroethane,
- 3.42 parts of carbon black (Printex® 60 by Degussa) and
- 0.014 parts of dibutyltindilaurate until the mixture became completely homogeneous.

Component B:

In order to produce an isocyanate group containing prepolymer, 100 parts of a polyester polyol prepared from adipic acid, diethylene glycol, and trimethylolpropane with an average functionality of 2.6, an OH number of 55 and a viscosity of 1300 mPas, measured at 75° C., was reacted with a mixture of 162.57 parts of 4,4'-diphenylmethane diisocyanate and 37.51 parts of a commercially available carbodiimide-modified 4,4'-diphenylmethane diisocyanate at a temperature of 80° C. in two hours. This resulted in an isocyanate group containing carbodiimide-modified prepolymer having an NCO content of 19.8 percent by weight and a viscosity of 2400 mPas at 20° C.

Component A and Component B were heated to 23° C. and, in a weight ratio of 100:92, were mixed intensively for 10 seconds and the resulting mixture was poured into an aluminum mold which had been heated to 45° C.

The cream time was 18 seconds, the rise time 45 seconds. The freely foaming foam had a gross density of 68 grams per liter.

The part was unmolded after three minutes. The surface was very smooth and free of pores. The part did not shrink and the core had a very uniform fine-celled foam structure.

The following mechanical properties were measured using samples having the following dimensions and bulk densities:

| Sample A: | 200 × 200 × 10 mm |
|---|---|
| Bulk density | 300 g/l |
| Hardness Shore A | 49 |
| Tear strength, DIN 53,571 (N/mm²) | 1.32 |
| Breaking elongation, DIN 53,571 (%) | 160 |
| Graves tear strength DIN 53,575 (N/mm) | 7.50 |

| Sample B: | 260 × 210 × 40 mm |
|---|---|
| Bulk density | 150 g/l |
| Compressive stress according to DIN 53,577 (N/cm²) | |
| 20% compression | 2.06 |
| 40% compression | 3.08 |
| 60% compression | 6.70 |

COMPARATIVE EXAMPLE D

Component A:

100 parts of a polyester polyol prepared from adipic acid, 1,4-butanediol, 1,5-pentanediol, and 1,6-hexanediol with an OH number of 56 and a viscosity of 650 mPas measured at 75° C.

were mixed with

- 13.86 parts ethylene glycol,
- 1.22 parts of a 33 percent solution of diazobicyclooctane in dipropylene glycol,
- 0.41 parts of silicone polyol (Tegostab B 4822),
- 13.59 parts of trichlorofluoromethane,
- 3.4 parts of trichlorotrifluoroethane,
- 3.4 parts of carbon black (Printex 60),
- 0.07 part of dibutyltindilaurate until the mixture was completely homogeneous.

Component B corresponds with that of Example 9.

Components A and B were heated to 23° C. and, at a weight ratio of 100:91, were mixed intensively for 10 seconds and were poured into an aluminum mold heated to 45° C.

The cream time was 18 seconds, the rise time 45 seconds. The freely foaming polyurethane foam had a bulk density of 80 grams per liter.

The molded part was unmolded after five minutes. The edge area had a slight orange-peel structure; the molded part began to shrink slightly after cooling; and the core area had a relatively coarse irregular cell structure.

The following mechanical properties were measured using samples produced in accordance with Example 9:

| Sample A: | |
|---|---|
| Hardness Shore A, DIN 53,505 | 51 |
| Tear strength according to DIN 53,571 (N/mm²) | 1.82 |
| Breaking elongation, DIN 53,571 (%) | 220 |
| Graves tear strength DIN 53,575 (N/mm) | 8.00 |

| Sample B: Compression stress according to DIN 53,577 (N/cm²) | |
|---|---|
| 20% compression | 2.02 |
| 40% compression | 2.80 |
| 60% compression | 5.58 |

A comparison of Example 9 with Comparative Example D shows that the addition of filler improves the foam morphology, prevents shrinking and causes a marked increased of the compression resilience with higher compression (60%).

The embodiments of the invention in which an exclusive privilege or property is claimed are as follows:

1. A process for the manufacture of reinforced foamed polyurethane plastics based on organic polyisocyanates, polyols, fillers, catalysts, foaming agents and possibly chain extending agents and additives wherein fine particle dispersions are used as fillers, said fillers are produced by in situ crushing with high local energy density to particle sizes of less than 7 microns and simultaneous dispersion of organic and/or inorganic fillers and polyols or organic polyisocyanates.

2. The process according to claim 1 wherein the local energy density is 50 to 3000 kilowatts per cubic meter.

3. The process according to claim 1 wherein the particle size is 0.01 to 7 microns.

4. The process according to claim 1 wherein inorganic fillers are used as fillers.

5. The process according to claim 4 wherein silicates, metallic oxides, metal salts, inorganic pigments, glass, asbestos meal or mixtures of the referenced filling materials are used as inorganic fillers.

6. The process according to claim 1 wherein coal and organic pigments are used as organic filler materials.

7. The process according to claim 1 wherein polyols are used as dispersing medium.

8. The process according to claim 7 wherein polyester polyols and/or polyether polyols having molecular weights of 200 to 8000 and hydroxyl numbers of 15 to 800 are employed as polyols.

9. The process according to claim 8 wherein polyether polyols are employed.

* * * * *